March 29, 1960   V. F. BLEFARY ET AL   2,931,027
VISUAL DISPLAY APPARATUS
Filed Oct. 19, 1956   4 Sheets-Sheet 1
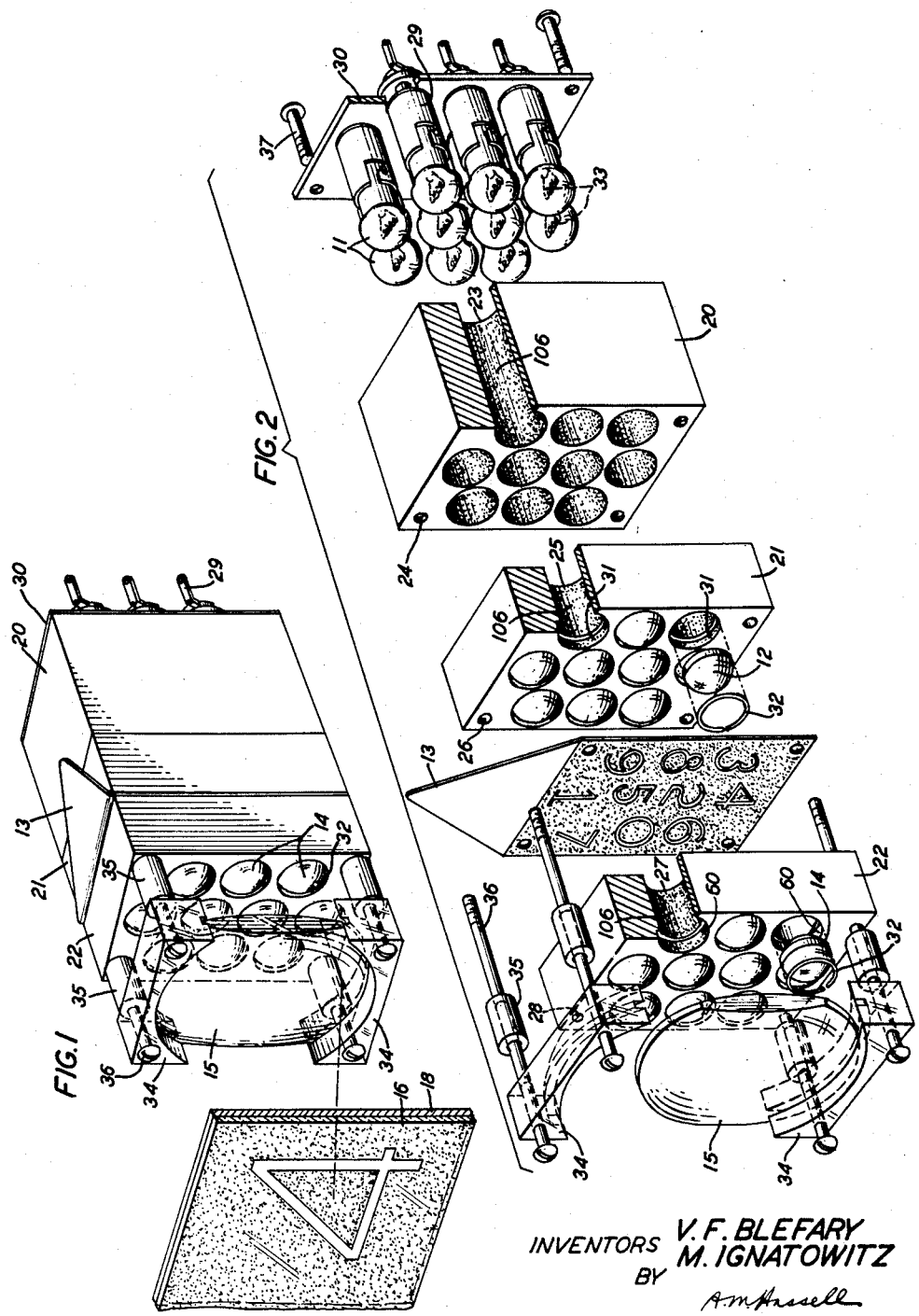
INVENTORS V. F. BLEFARY
M. IGNATOWITZ
BY
ATTORNEY March 29, 1960  V. F. BLEFARY ET AL  2,931,027
VISUAL DISPLAY APPARATUS
Filed Oct. 19, 1956  4 Sheets-Sheet 2

INVENTORS V. F. BLEFARY
            M. IGNATOWITZ
BY
ATTORNEY

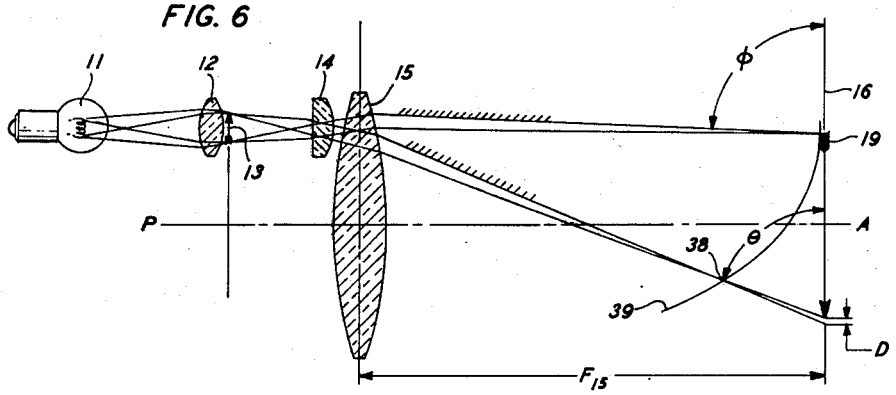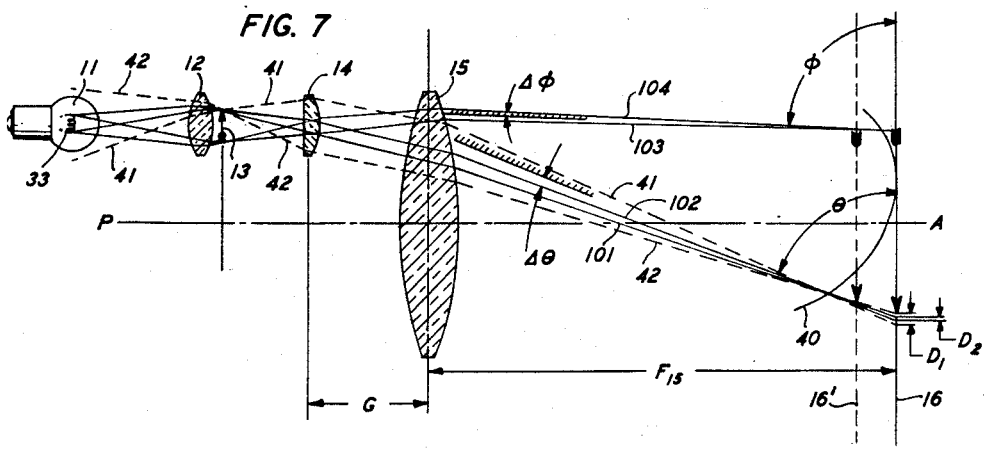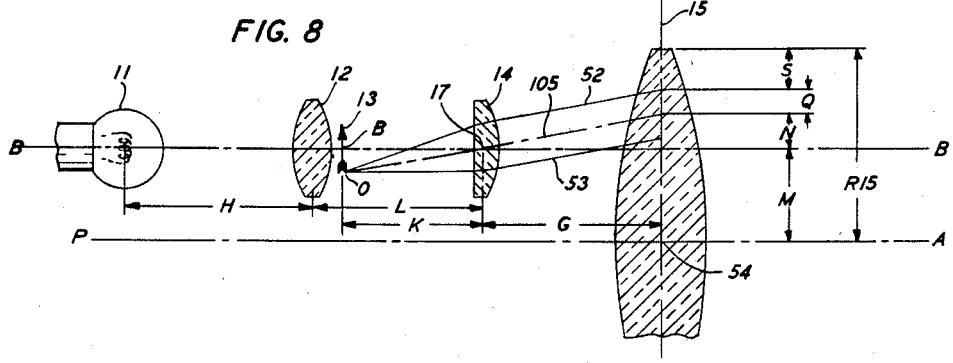

March 29, 1960 V. F. BLEFARY ET AL 2,931,027
VISUAL DISPLAY APPARATUS
Filed Oct. 19, 1956 4 Sheets-Sheet 4

INVENTORS V. F. BLEFARY
M. IGNATOWITZ
BY
ATTORNEY

United States Patent Office 2,931,027
Patented Mar. 29, 1960

2,931,027

VISUAL DISPLAY APPARATUS

Vincent F. Blefary, Mahwah, N.J., and Michael Ignatowitz, Brooklyn, N.Y., assignors to Bell Telephone Laboratories, Incorporated, New York, N.Y., a corporation of New York Application October 19, 1956, Serial No. 617,196

15 Claims. (Cl. 340—378)

This invention relates to a visual display device and more particularly to such a device which is rendered effective to display any one of a plurality of symbols by the operation of a corresponding one of a plurality of projectors, all of the projectors being effectively directed to the same area of a display surface.

Presently known visual display devices suffer from one or more undesirable characteristics which are inherent in their design. Mechanical stepping devices operate slowly as compared to all-electric devices; they must be stepped to normal after operation and require auxiliary stepping equipment. Selective-element cathode illumination devices are restricted in the shape and color of the symbol expressed thereby, are limited in the value of luminous intensity practically available, exhibit poor resolution because of the characteristic cathode glow, and require high voltage power supplies and auxiliary switching apparatus. Edge-illuminated stacked and etched translucent sheet devices are restricted to approximately direct-front viewing because of the depth of the stack and suffer from a degradation of image clarity deeper in the stack as a consequence of the increased number of non-illuminated etched symbols interposed between the observer and the illuminated sheet. A plurality of lamps set in an array and selectively operated, thereby expressing a symbol formed by a pattern of illuminated lamps, may require complicated auxiliary switching apparatus and, unless the number of lamps is extremely large, is neither readily readable nor adaptable to a wide variety of symbols.

One general object of this invention is to improve display devices.

Other objects of this invention are to provide simplicity in selection and display, to improve resolution and provide a greater range of satisfactory viewing angles, to render display apparatus more nearly failure-proof, to utilize available projector light more efficiently, and to render displayed images more nearly uniform in luminous intensity.

A feature of the present invention is the association of a single light source and symbol with each of a plurality of projectors, thereby facilitating individual selection and display of any symbol; and, in addition, decreasing the likelihood of displaying any unwanted symbol should the apparatus fail.

Another feature of this invention is a cooperative arrangement of a multichannel projection lens and a plurality of projector lens arrays, whereby any one of a plurality of symbols may be projected upon the same area of a surface with good resolution, color, configuration, contrast, and luminous intensity.

Still another feature of the invention is the orientation of the longest dimension of the projection lamp filaments in a direction perpendicular to the longer dimension of the symbols projected, thereby providing uniformity of illumination in the displayed image.

A further feature of the invention is the physical relationship of the display surface and one of the optical elements wherein the distance between them is equal to substantially ninety-six percent of the focal length of such element, thereby improving resolution and rendering the displayed image more nearly uniform in luminous intensity.

In brief, this invention comprises a number of axially parallel individual projectors, a single symbol associated with each particular projector, a translucent display surface, and a lens system for directing the light from any of the projectors to substantially the same area on the display surface. An image of a selected symbol will appear on the display surface in response to the activation of the light source in the corresponding projector.

Additional objects and features of the present invention will become apparent from the following description by way of example, the appended claims, and the drawing in which:

Fig. 1 is a perspective view of an illustrative embodiment of the invention;

Fig. 2 is an exploded view of the projection and focusing apparatus of Fig. 1;

Figs. 6–9 are ray diagrams which show the optical interrelation of the elements of Fig. 5.

Figure 3:
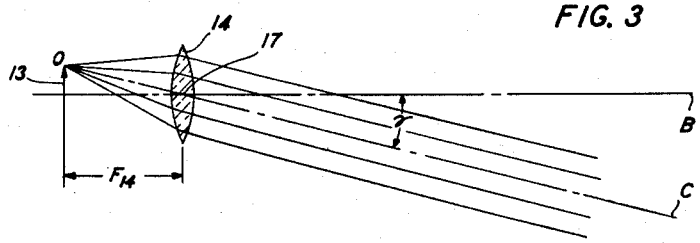
Figs. 3 and 4 are ray diagrams which show an ideal lens system in which images of two points located in different areas of a primary focal plane are focused at a common point in a secondary focal plane.

Referring now to Figs. 1 and 2, an exemplary embodiment of the invention is depicted therein and comprises a block 20 in which there are drilled ten axially parallel cylindrical apertures 23 of equal diameter (Fig. 2) and four additional cylindrical apertures 24 which are drilled and tapped to mate with the threads cut on bolts 36 and 37. Each of blocks 21 and 22 has sets of cylindrical apertures 25 and 27 which are in axial alignment with corresponding apertures 23. In addition, blocks 21 and 22 have cylindrical apertures 26 and 28 which correspond to apertures 24 but which are not tapped. When blocks 20, 21 and 22 are assembled, the sets of apertures 23, 25 and 27 and sets 24, 26 and 28 are aligned to form two sets of cylindrical apertures which pass entirely through all three blocks. The inner surfaces 106 of apertures 23, 25 and 27 should be coated with a flat black light-absorbing substance in order to prevent undesirable reflections of light therefrom. They may be advantageously prepared by anodizing.

Ten lamps 11 are mounted in sockets 29 which may be riveted to plate 30 on the same centers as apertures 23. The sockets are so orientated that the longest dimension of each of the lamp filaments 33 is perpendicular to the longer dimension of the symbols 0–9 which are shown on film strip 13. Ten symmetrically biconvex condensing lenses 12 are inserted into recesses 31 which are counterbored in apertures 25. These lenses are held in place by Phosphor bronze retaining springs 32 or other suitable means which expand against the sides of the recesses when the lenses are installed. In the same manner, ten single channel objective lenses 14 are held in place within counterbored openings 60 in block 22. A high contrast film negative 13 having thereon the symbols desired to be displayed is positioned between blocks 21 and 22. The symbols are in the form of transparent or translucent configurations on an otherwise opaque background, and are spaced to fall in alignment with the adjacent apertures 25 and 27. Multichannel projection lens 15 is held by upper and lower lens mounting blocks 34 which are grooved to mate with the upper and lower lens extremities. Spacers 35 on screws 36 provide the correct spacing between lenses 14 and 15. The unit is held together by four screws 36 which pass through lens blocks 34, spacers 35, apertures 28, film strip 13, and apertures 26 into the tapped holes 24. Plate 30 is mounted by four screws 37 which pass through the plate into tapped holes 24. The display surface, which may be a translucent screen such as screen 16, is shown in Fig. 1.

The apparatus of Figs. 1 and 2 is rendered effective to clearly project any one of the symbols on film strip 13 upon the same area of the display surface because the optical elements are constructed to exhibit selected characteristics and because they are disposed in the manner now to be described.

Referring to Fig. 3, objects 13, an arrow, is located in a plane, called the primary focal plane, which is perpendicular to the principal axis B of lens 14 and separated from the lens by a distance equal to the equivalent focal length $F_{14}$ thereof. It is well known that light rays emanating from a point such as point O will emerge from lens 14 parallel to chief ray OC, the direction of ray OC being determined by the location of point O and the optical center 17 of lens 14, provided the lens is positive and ideal. Thus all emergent rays will make an angle B—17—C or $\gamma$ with the principal axis B. Conversely, any rays that may be parallel to ray OC and oppositely directed, i.e., toward lens 14, will be focused at point O.

Figure 4:
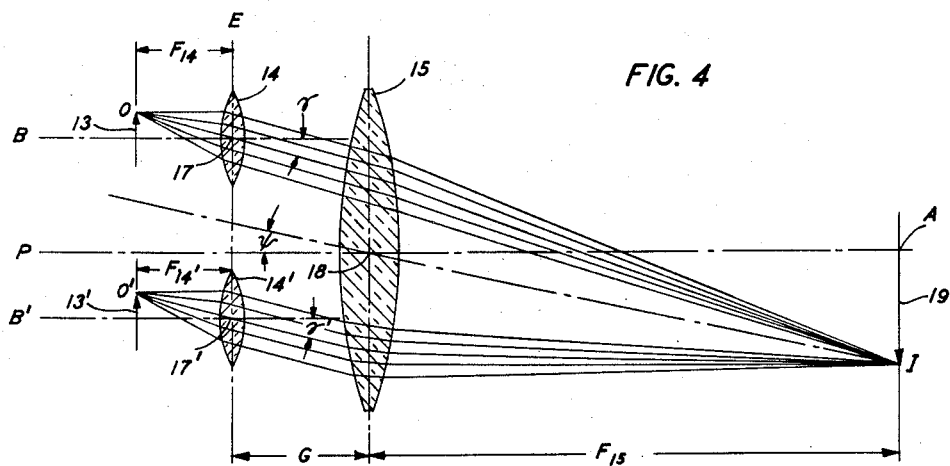

Referring now to Fig. 4, two lenses 14 and 14' are positioned on axes B and B' respectively. These lenses are similar to lens 14 of Fig. 3 in that they are located at focal distances $F14$ and $F14'$ from the arrows 13 and 13'. Lens 15 is similar to lens 14 in that it is positive and ideal, but is different from lens 14 in that it has a considerably greater focal length $F_{15}$. Principal axes PA, B, and B' of lenses 15, 14 and 14', respectively, are parallel, and rays from points O and O', when emergent from their respective lenses 14 and 14', are parallel and make equal angles with axis PA since they also make equal angles $\gamma$ and $\gamma'$ with axes B and B'. It should now be recalled from Fig. 3 that parallel rays which are incident to a lens such as lens 15 converge at a single point such as point I at a focal length $F_{15}$ from the lens. It is therefore apparent that as points O and O' on objects 13 and 13' are moved toward the axes B and B' respectively, angles $\gamma$, $\gamma'$ and $\psi$ become smaller and point I approaches point A on the principal axis PA. Since the two lens elements 14 and 14' centered on randomly placed principal axes B and B' are shown to focus images at the same point through lens 15, it may be concluded that the focus of an image at I is independent of the distance between the axes B, B' and P behind lens 15 and is only a function of the distance from the point (such as point O and O') on the symbol to the principal axis (such as B or B') of its associated lens (such as 14 or 14'), subject to the obvious limitation that the distances BP and B'P must not exceed those which would result in the loss of some of the parallel light rays that are incident to lens 15. The distance G which is the separation between the optical centers of lenses 14 and 15 is determined by considerations hereinafter set forth.

Figure 5:
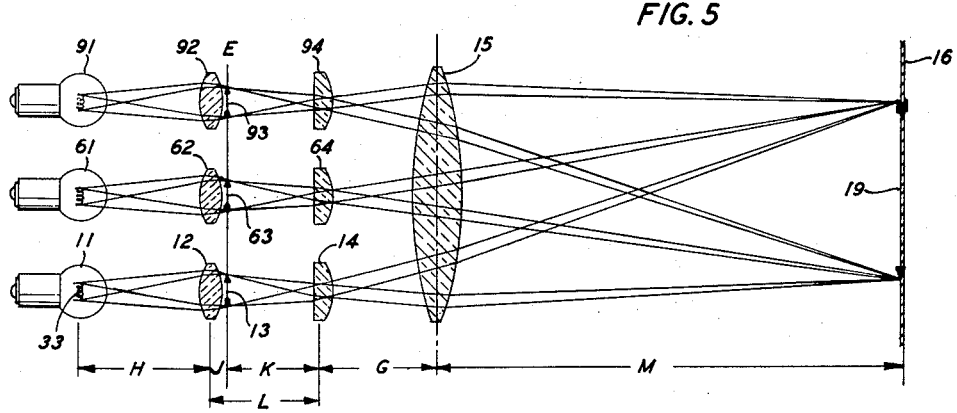
Fig. 5 is a ray diagram which shows lens elements constructed and arranged in accordance with principles underlying the invention.

Referring now to Fig. 5, a light source 11 is placed a greater distance H from the condensing lens 12 than the focal length thereof to ensure that the rays emergent from lens 12 will converge. The single channel objective lens 14 should be maximally corrected for spherical aberration, but need not be aspherized, and is located with the optical center at the image point of filament 33; that is to say, the distance L between lenses 12 and 14 is the conjugate image distance which corresponds to the object distance H between the lamp filament 33 and the lens 12. Consequently, only a small axial zonal area of lens 14 is used, thereby giving the effect of stopping down the aperture of the lens and thereby further reducing the effect of spherical aberration.

The quality of the image projected on the display surface is, in part, a function of the physical size of the light source, a point source being the most advantageous. If filament 33 in Fig. 7 were small (as shown) and therefore a quasi-point light source, rays emanating therefrom and directed through the tip and tail of arrow 13 would follow paths bounded by the solid lines 101 and 102, and 103 and 104 respectively. On the other hand, if the filament were large (not shown), light rays therefrom which relate to the head of arrow 13 would follow paths bounded by the dashed lines 41 and 42. It can readily be observed that the focus at screen 16 is substantially more critical when the source of light is large than when the source of light is small, since the distance $D_1$ is substantially greater than $D_2$. An additional advantage which accrues through the use of a quasi-point light source is the aforementioned reduction in the effect of spherical aberration which results from the utilization of a smaller area of lens 14.

Returning now to Fig. 5, the symbol on the film 13 is located a distance K (equal to the focal length $F_{14}$ of lens 14) from lens 14 according to well-known practice, thereby placing the symbol in the primary focal plane of lens 14. This ensures that all rays from any one point on object 13 will be parallel after passing through lens 14. The separation J between the condensing lens 12 and the symbol 13 is made as small as physically possible to ensure that the entire symbol will be fully illuminated. The two other projector arrays 91 . . . 94 and 61 . . . 64 are included in order to show that a plurality of symbols such as arrows 13, 63 and 93 which are located at various points in the primary focal plane E cast superimposed and in this case identical images 19 on screen 16.

It should be observed that symbols 13, 63 and 93 in Fig. 5 correspond to three of the numerical symbols 0, 1 . . . 8, 9 which are incorporated in film strip 13 of Fig. 2. These symbols also correspond to symbols 13 and 13' in Fig. 4. Thus it may be seen that the descriptions referring to Figs. 4 and 5 show in detail the manner in which a numerical symbol such as the number 4, located at the bottom of film strip 13 in Fig. 2 and a considerable lateral distance from the axis of lens 15, will nevertheless always appear centered on screen 16 (Fig. 1).

Since in the herein described illustrative embodiment the single channel objective lens 14 is maximally corrected for spherical aberration, the multichannel projection lens 15 should perhaps be left uncorrected for this defect. The correction for aberration in any lens emphasizes pincushion distortion in the displayed image and the total of such distortion resulting from the corrections of both lenses 14 and 15 would exceed tolerable limits. Compensation is made for the aberration of lens 15 by adjusting the distance G between lens 14 and lens 15 and by suitably locating screen 16, thereby mitigating the detrimental effects of the aberration and rendering the array effective to project a relatively sharply focused image on the screen according to principles hereinafter more fully set forth.

Referring to Fig. 6, the single channel objective lens 14 and multichannel projection lens 15 are located close together. As a result, one of the pencils of rays refracted by lens 15 comes to a focus 19 at the screen 16 and forms the top edge of the image. The other pencil of rays which forms the bottom edge of the image comes to a focus 38 before reaching the screen. The image on the screen is therefore sharply defined at the top and blurred at the bottom. The focal distribution 39 may be defined as the locus of the foci of the individual pencils of rays emanating from the plurality of points which comprise the object.

Referring now to Fig. 7 and disregarding dotted rays 41 and 42, the increased separation of lenses 14 and 15 results in an alteration of the focal distribution to that of 40, with the pencils of rays at both the top and bottom coming into focus before reaching the screen. The point of focus of the tip of the arrow in Fig. 7 is nearer to the screen and consequently better than in Fig. 6 ($D_2$ being smaller than D), and the near perpendicularity of the rays incident to the screen at the top, i.e., tail of the arrow, in Fig. 7, reduces the adverse effect of such prefocusing. The focal distribution 40 is tangent to the screen 16, but if the screen is moved approximately 0.04 $F_{15}$ to point 16′, a further improvement in average resolution is obtained because the focal distribution then straddles the screen. In this and the previous figure, Fig. 6, dimensions are shown to the principal planes of the lenses and it should be understood that wherever the well-known "thick lens" theory applies, all dimensions shown to the center of lenses should be made to the principal planes of such lenses in accordance with such theory.

In addition to the aforementioned influence that dimension G exerts on the image focus, said dimension also affects the uniformity of the apparent luminous intensity throughout the projected symbol. It is well known that the illuminance of an area of a translucent plane illuminated by light impinging on the back thereof appears to an observer located in front thereof to be a function of the angle which such impinging light makes with the plane. The luminous intensity of any point in the plane appears greatest when the light incident to the plane is parallel to a line joining the point and the observer. A requirement, therefore, for equal apparent luminous intensity in a symbol projected through a translucent screen is that all light rays comprising the symbol impinge on the translucent surface at substantially the same angle.

Referring again to Fig. 6, the upper line (hatched) of the pencil of rays which forms the top of the symbol makes an angle $\phi$ with screen 16; the upper line (hatched) of the pencil of rays which forms the bottom of the symbol makes an angle ⒷⒷ with screen 16. In Fig. 7, where the hatched line segments indicate the position of the corresponding hatched lines in Fig. 6, the increase in distance G has decreased the angle $\phi$ by $\Delta\phi$ and increased the angle ⒷⒷ by $\Delta$ⒷⒷ, thereby reducing the difference between ⒷⒷ and $\phi$ by an amount equal to $\Delta\phi + \Delta$ⒷⒷ. It would therefore appear to be advantageous to increase the distance G, thereby to render the angles of incidence of light rays impinging upon the screen more nearly uniform. However, as such distance is increased, a point is reached at which a part of the light transmitted through lens 14 escapes past the lens 15. This will be apparent from a consideration of the rays (Fig. 7) which rise as they pass from lens 14 to lens 15. If the dimension G were sufficiently great, these rays would pass over the top of lens 15 and thus be lost. The optimum dimension G will therefore be that at which the outermost rays are directed into lens 15 near the periphery thereof.

Referring to Fig. 8, if the radius $R_{15}$ of lens 15, the dimension M, the dimensions H, K, and L which have been discussed heretofore, the size of object 13, and the distances Q and S (which will be hereinafter discussed) are all known, then the distance N is the difference between $R_{15}$ and the sum of M, Q, and S; and, by simple trigonometry, G is equal to K times the ratio of N to OB, OB being one-half the overall height of object 13. The aforementioned distance S is a constant value determined by the tolerances allowed in the other dimensions M, N, and Q and should be somewhat greater than the depth of the grooves in lens mounting block 34 (Fig. 2). To simplify the discussion of the interrelationship of the elements of Fig. 8, dimensions are shown to the centerline of the lenses. However, it should be borne in mind that such dimensions actually relate to the principal planes thereof rather than the physical centers.

The beam of light bounded by rays 52 and 53, if cut by a plane passing through the center of lens 15 and perpendicular to axis B—B, will appear to have an elliptical cross section; and the chief ray 105 of the beam passes through the intersection of the major and minor axes of such ellipse. The distance Q is the distance between such intersection and the upper intercept on the major axis of the ellipse.

Figure 9:
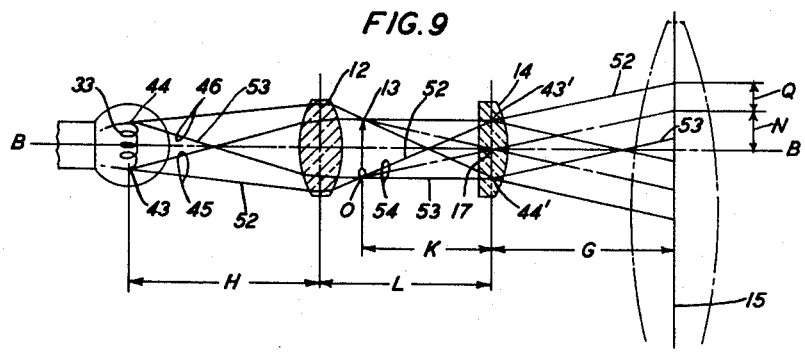

Referring now to Fig. 9, lenses 12 and 14 have been arranged to bring the image of filament 33 into focus in a plane containing the optical center 17 of lens 14. Rays which emanate from point 43 on this filament and which comprise pencil 45 are in focus at 43′. Similarly, rays from point 44 are in focus at 44′. Ray 52 is emitted from point 43 and passes through point O, the lowermost point on the object 13. Ray 53 is emitted from point 44 at the other extremity of the filament and passes through point O. All other rays emitted from the filament which pass through point O fall between these two rays and comprise the pencil 54. The chief ray of this pencil follows the straight line which joins point O and optical center 17 of lens 14. In the space beyond lens 14, boundary rays 52 and 53 are parallel to chief ray O—17, this condition having been shown in Fig. 3 to be the consequence of the location of object 13 in the primary focal plane of lens 14. From the diagram, the dimension Q is seen to be equal to the distance 17—43′. This latter distance is the filament half-length B—43 multiplied by the ratio of L to H. Since, as hereinbefore set forth, the distance G equals $$\left(\frac{K}{OB}\right)N$$

(Figs. 8 and 9), since for a given arrangement of elements Q, M, and S are constant, and since N equals radius $R_{15}$ minus $(M+Q+S)$, G equals $$\frac{K}{OB}[R_{15} - K']$$

where K′ equals $M+Q+S$. Therefore distance G is a function of the radius $R_{15}$. In the illustrative exemplary embodiment disclosed in Figs. 1 and 2, dimension G (not shown) equals substantially 76 percent of the radius $R_{15}$ of lens 15. Of course, variations from this value consistent with the before-mentioned principles will be apparent to those skilled in the art.

Figure 10:
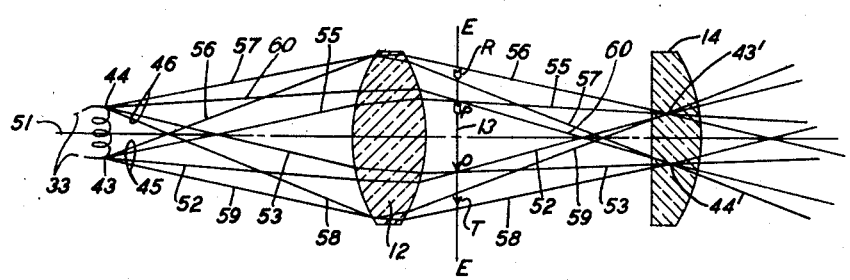
Figs. 10, 11 and 12 are diagrams which illustrate the effect produced by changing the orientation of the projector lamp filaments.

Referring now to Fig. 10, in which the effect of the refraction caused by lens 14 has been omitted to increase the clarity of the disclosure, the longest dimension of the filament 33 is parallel to the longer dimension of the symbol 13. It is well known that for a given image size and light source, the illuminance at a given point on the display surface is greatest when the magnification ratio is smallest, that is, in Fig. 10, when symbol 13 is largest. It is apparent that if the symbol is small, for example, the size of the small arrow 13 which has its head at point O, light ray 53 from point 44 on filament 33 and light ray 52 from the other extremity 43 of filament 33 will illuminate point O. Similarly rays 60 and 55 will illuminate point P.

From a consideration of every point along the filament 33, it becomes clear that every point on the short arrow is illuminated by every point on the filament. The ray diagram (Fig. 10) shows a distinct separation between rays 52 and 53 and also between rays 60 and 55 at the points where they enter the left-hand surface of lens 12. This separation is a prerequisite for their crossing in plane E because they strike lens 12 at different angles and are therefore refracted differently. Thus, since rays from both filament extremities pass through the tip and tail of small arrow 13, the latter will be illuminated evenly along its entire length by light emanating from every point along the filament. However, if the tip and tail of the arrow are lengthened to points T and R respectively, the arrow will not be evenly illuminated for the following reasons.

Referring again to Fig. 10, it will be noted that rays 56 and 57 are substantially the uppermost rays that can enter lens 12. Rays directed from the filament at more sharply inclined angles will pass by the lens and will be lost. Since rays 56 and 57 strike lens 12 at the same point and at different angles, they cannot come to focus in plane E of the arrow. Accordingly, the tail R of the extended arrow is illuminated by light emanating from point 43 of filament 33 which falls within the cone of light bounded by rays 56 and 59 and not by light within the cone of light bounded by rays 57 and 58 which emanates from point 44 of filament 33. Therefore the tail will not be illuminated by rays emanating from all points along the filament, and since the central portion OP is lighted by rays emanating from all points along the filament, the entire extended arrow TR will be unevenly illuminated. Thus the size of the arrow (or other object which is to be displayed) is limited by the peripheral areas of uneven illumination that result from the distributed source of light.

Figure 11:
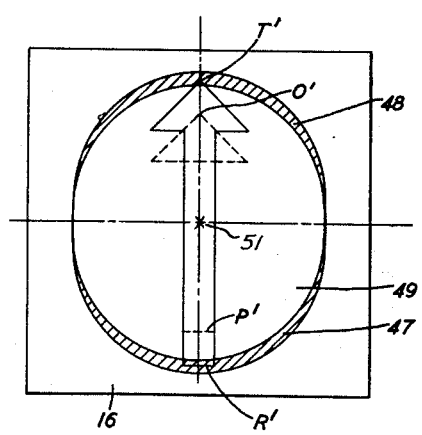

Fig. 11 shows both arrows as they would appear displayed on surface 16. Center line 50 is parallel to dimension 43—44 of filament 33 (Fig. 10) and is intersected by center line 51 (Fig. 10) in the center of area 49. The image O'P' of small arrow OP lies wholly within the evenly illuminated area 49, whereas the image T'R' of the lengthened arrow TR extends into the partially lighted areas 47 and 48. Since the symbols, i.e., the arrows, are transparent or translucent configurations on otherwise opaque backgrounds, the image of the large arrow will appear to have a shaded head T' and tail R', while the smaller arrow, shown dotted from O' to P', will appear to be of uniform luminous intensity throughout.

Figure 12:
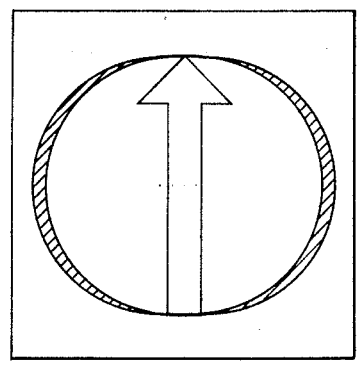

Fig. 12 depicts the changed screen pattern that results from rotating filaments 33 (Fig. 10) through 90 degrees. The top and bottom of the lighted area are now evenly illuminated since the filament much more nearly approaches a point source of light in the vertical direction. Thus, it is advantageous to orient the main axis of the lamp filament in a position 90 degrees displaced from the longer dimension of the displayed symbol. In Fig. 5 . . . 9 the ray diagrams show the filaments orientated in the disadvantageous direction, the direction perpendicular to the short dimension of the objects, only for clarity in disclosing other features.

Now returning once again to Figs. 1 and 2, it will be seen that the ten lamps 11, the ten condensing lenses 12, the ten symbols 0–9 on film strip 13 and the ten single channel objective lens 14 are arranged to project images of the ten symbols through lens 15 to screen 16 in accordance with the principles herein set forth. Sheet 18 which is shown immediately adjacent to screen 16 is a transparent colored sheet which may be installed to produce a colored image on the screen. If black and white images are to be displayed, the sheet may be omitted.

Of course, there are other ways to produce colored images which will occur to those skilled in the art. For example, colored lamps, films, or screens could be utilized to produce colored images.

Any one or a combination of the symbols may be projected upon the screen by appropriately energizing the lamps through suitable switches (not shown). Thus the arrays of Figs. 1 and 2 are effective to selectively project the aforementioned symbols clearly and substantially instantaneously.

The principles underlying the present invention have been disclosed by the description of a specific embodiment particularly treating ten projectors utilizing a translucent screen for the display of digits; however, the invention is not limited to the specific apparatus herein disclosed. Various applications, modifications and arrangements of the invention will occur to those skilled in the art. For example, additional pluralities of individual projectors could be added to those shown, provided the size and arrangement of the remaining elements were modified correspondingly; or, if it were desired to provide an animated display, each projector could be arranged to project one of the "frames" thereof and the light sources could be operated in appropriate sequence, thereby to give the illusion of animation.

What is claimed is:

1. Visual display apparatus comprising a plurality of axially parallel projectors each including a lamp having a filament with a long dimension and a short dimension and a translucent sheet embodying a symbol to be displayed; a multichannel projection lens common to all of said projectors and being axially parallel therewith; a display surface; said filament being orientated with its long dimension in a plane substantially parallel to said sheet and in a direction substantially perpendicular to the direction of the longer dimension of said symbol; and said display surface being located at a distance from said multichannel projection lens of substantially ninety-six percent of the focal length thereof.

2. Visual display apparatus comprising a plurality of axially parallel projectors each including a lamp having a filament with a long dimension and a short dimension, a translucent sheet embodying a symbol to be displayed, and a single channel objective lens; a multi-channel projection lens common to all of said projectors and being axially parallel therewith; said filament being oriented with its long dimension in a plane substantially parallel to said sheet and in a direction substantially perpendicular to the direction of the longer dimension of said symbol; and said single channel objective lens and said multi-channel projection lens being separated by a distance equal to substantially thirty-eight percent of the diameter of said multichannel lens.

3. Visual display apparatus comprising a plurality of axially parallel projectors each having a single channel objective lens; a multichannel projection lens common to all of said projectors and being axially parallel therewith; a display surface, said display surface being located at a distance from said multichannel projection lens of substantially ninety-six percent of the focal length thereof; and said single channel objective lens and said multichannel projection lens being separated by a distance equal to substantially thirty-eight percent of the diameter of said multichannel lens.

4. Visual display apparatus comprising a plurality of axially parallel projectors each including a lamp having a filament with a long dimension and a short dimension, a translucent sheet embodying a symbol to be displayed, and a single channel objective lens; a multichannel projection lens common to all of said projectors and being axially parallel therewith; a display surface; said filament being orientated with its long dimension in a plane substantially parallel to said sheet and in a direction substantially perpendicular to the direction of the longer dimension of said symbol; said display surface being located at a distance from said multichannel projection lens of substantially ninety-six percent of the focal length thereof; and said single channel objective lens and said multichannel projection lens being separated by a distance equal to substantially thirty-six percent of the diameter of said multichannel lens.

5. Visual indicating apparatus comprising a display surface; a plurality of axially parallel projectors each including a source of light, a translucent sheet embodying a symbol to be displayed upon said display surface, a symmetrically biconvex condensing lens for condensing light radiated from said source, a single channel objective lens maximally corrected for spherical aberration for focusing an image of said symbol, said source of light being a lamp having a filament with a long dimension and a short dimension located at a greater distance from said condensing lens than the focal length thereof, said translucent sheet being located immediately adjacent said condensing lens and in substantially the primary focal plane of said single channel objective lens, and said single channel objective lens being located with its optical center at substantially the image point of the filament of said lamp; a symmetrically biconvex multi-channel projection lens common to all of said projectors and being axially parallel therewith for directing all of the images produced by said projectors to a common area of said display surface; and means for selectively activating said projectors thereby to project any of said symbols upon the same area of said display surface.

6. Apparatus according to claim 5 wherein said filament is orientated with its long dimension in a plane substantially parallel to said sheet and in a direction substantially perpendicular to the direction of the longer dimension of said symbol.

7. Apparatus according to claim 5 wherein said display surface is located at a distance from said multichannel projection lens of substantially ninety-six percent of the focal length thereof.

8. Apparatus according to claim 5 wherein said single channel objective lens and said multichannel projection lens are separated by a distance equal to substantially thirty-eight percent of the diameter of said multichannel lens.

9. In a visual display apparatus comprising a lamp having a filament with a half-length U, a condensing lens located a distant H from said filament, a single channel objective lens located a distance L from said condensing lens, a symbol to be projected having a half-length ŪB, said symbol being located a distance K from said objective lens, and a multichannel projection lens having a radius R and having a peripheral radial segment S which is unavailable for the passage of light from said filament and being axially parallel with said single channel lens; a separation between said single channel objective lens and said multichannel lens having a magnitude substantially equal to $$\frac{K}{\bar{OL}}\left[R - M - \frac{UL}{H} - S\right]$$

where M is the distance between the axis of said multichannel lens and the axis of said single channel lens when said single channel lens is in its most laterally remote position with respect to the axis of said multichannel lens.

10. Visual display apparatus comprising a translucent sheet embodying symbols to be displayed and a plurality of removable fixed lamps each having a filament with a long dimension and a short dimension and a base, said lamps being arranged with their bases in parallel axially with each other and perpendicular to the plane of said sheet, each of the filaments of said lamps having its long dimension oriented in a plane substantially parallel to the plane of said sheet and in a direction substantially perpendicular to the direction of the longer dimensions of said symbols.

11. Visual display apparatus comprising a symmetrically biconvex multichannel objective lens and a plurality of axially parallel projectors each having a single channel objective lens, said multichannel objective lens being common to all of said projectors and axially parallel therewith, and the single channel lenses and said multichannel lens being separated by a distance equal to substantially thirty-eight percent of the diameter of said multichannel lens.

12. Visual display apparatus comprising a multichannel objective lens, a translucent sheet embodying symbols to be displayed, a display surface, a plurality of objective lenses, a plurality of condensing lenses, a plurality of selectively-operable sources of light, a first, a second, and a third block, said first block being fixed against said second block with said sheet being included between said blocks, said second block being fixed against said third block, each of said blocks having a corresponding plurality of axially parallel apertures passing entirely therethrough, one of said sources of light being located in each of the apertures in said third block, one of said condensing lenses being located in each of the apertures in said second block and immediately adjacent said sheet, one of said objective lenses being located in each of the apertures in said first block at the end of each of said apertures which is most remote from said sheet, means for holding said multichannel lenses in parallel axially with said apertures and between said apertures and said display surface, said surface being located within the field of the light emanating from said sources of light.

13. Visual display apparatus comprising a symmetrically biconvex multichannel objective lens, a translucent sheet embodying symbols to be displayed, a display surface, a plurality of single-channel objective lenses substantially maximally-corrected for spherical aberration, a plurality of condensing lenses, a plurality of selectively-operable lamps, a first, a second, and a third block of opaque material, said first block being fixed against said second block with said sheet being included between said blocks, said second block being fixed against said third block, each of said blocks having a corresponding plurality of axially parallel apertures passing entirely therethrough, one of said lamps being located in each of the apertures in said third block, one of said condensing lenses being located in each of the apertures in said second block and immediately adjacent said sheet, one of said single-channel objective lenses being located in each of the apertures in said first block at the end of each of said apertures which is most remote from said sheet, means for holding said multichannel lenses in parallel axially with said apertures and at a distance of substantially thirty-eight percent of the diameter of said lens from the single channel objective lenses located in said apertures, said surface being located at a distance from said multichannel lens of substantially ninety-six percent of the focal length thereof.

14. Visual display apparatus comprising a multichannel objective lens, a translucent sheet embodying symbols to be displayed, a display surface, a plurality of objective lenses, a plurality of condensing lenses, a plurality of selectively-operable lamps, a first, a second, and a third block of substantially opaque material, each of said blocks having front and back faces, said first block being fixed with its back face adjacent to the front face of said second block, said second block being fixed with its back face adjacent to the front face of said third block, each of said blocks having a plurality of corresponding axially parallel apertures passing entirely therethrough, the apertures in the front face of said first block having a recess shallowly counterbored to the diameter of said objective lenses, the apertures in the front face of said second block having a recess shallowly counterbored to the diameter of said condensing lenses, said sheet being located between said first and said second blocks, one of said lamps being located within each of the apertures in said third block, one of said condensing lenses being located in each of the recesses in said second block, one of said objective lenses being located in each of the recesses in said first block, holding means for holding said blocks tightly together and for holding said multichannel lens in parallel axially with said apertures and within the field of view of all of said apertures, said display surfaces being located within the field of view of said multichannel objective lens.

15. Visual display apparatus comprising a symmetrically biconvex multichannel objective lens, a translucent sheet embodying symbols to be displayed, a display surface, a plurality of single channel objective lenses substantially maximally corrected for spherical aberration, a plurality of symmetrically biconvex condensing lenses, a plurality of removable fixed and selectively-operable lamps, each having a filament, a first, a second and a third block of substantially opaque material, each of said blocks having front and back faces, said first block being fixed with its back face adjacent to the front face of said second block, said second block being fixed with its back face adjacent to the front face of said third block, each of said blocks having a plurality of corresponding axially parallel cylindrical apertures passing entirely therethrough, the apertures in the front face of said first block having a recess shallowly counterbored to the diameter of said single channel objective lenses, the apertures in the front face of said second block having a recess shallowly counterbored to the diameter of said condensing lenses, said sheet being located between said first and said second blocks, one of said lamps being located within each of the apertures in said third block, the filament of said lamp having its longest dimension oriented in a plane substantially parallel to the plane of said sheet and in a direction substantially perpendicular to the direction of the longer dimension of said symbols, one of said condensing lenses being located in each of the recesses in said second block, one of said single-channel objective lenses being located in each of the recesses in said first block, holding means for holding said blocks tightly together and for holding said multichannel lens in parallel axially with said apertures at a distance of substantially thirty-eight percent of the diameter of said lens from the single channel objective lenses located in the front face of said first block, said display surface being located at a distance from said multichannel lens of substantially ninety-six percent of the focal length thereof and being substantially centered upon the axis of said multichannel lens.

References Cited in the file of this patent

UNITED STATES PATENTS

| | | |
|---|---|---|
| 450,615 | Delany | Apr. 21, 1891 |
| 1,219,514 | Whitney | Mar. 20, 1917 |
| 1,665,426 | Verdich | Apr. 10, 1928 |
| 2,371,120 | Blakely | Mar. 6, 1945 |
| 2,515,862 | Carlton et al. | July 18, 1950 |
| 2,738,491 | Mihalakis | Mar. 13, 1956 |
| 2,787,785 | Hunter | Apr. 2, 1957 |
| 2,794,977 | Stoddart | June 4, 1957 |

FOREIGN PATENTS

| | | |
|---|---|---|
| 182,887 | Great Britain | July 7, 1922 |